3,493,454
PNEUMATIC TIRE BUILDING APPARATUS
Ralph F. Cooper, Akron, Ohio, and James W. Eckenwiler, Tucson, Ariz., assignors to The B. F. Goodrich Company, New York, N.Y., a corporation of New York
Filed Dec. 9, 1966, Ser. No. 600,513
Int. Cl. B29h 17/16
U.S. Cl. 156—415                                                    2 Claims

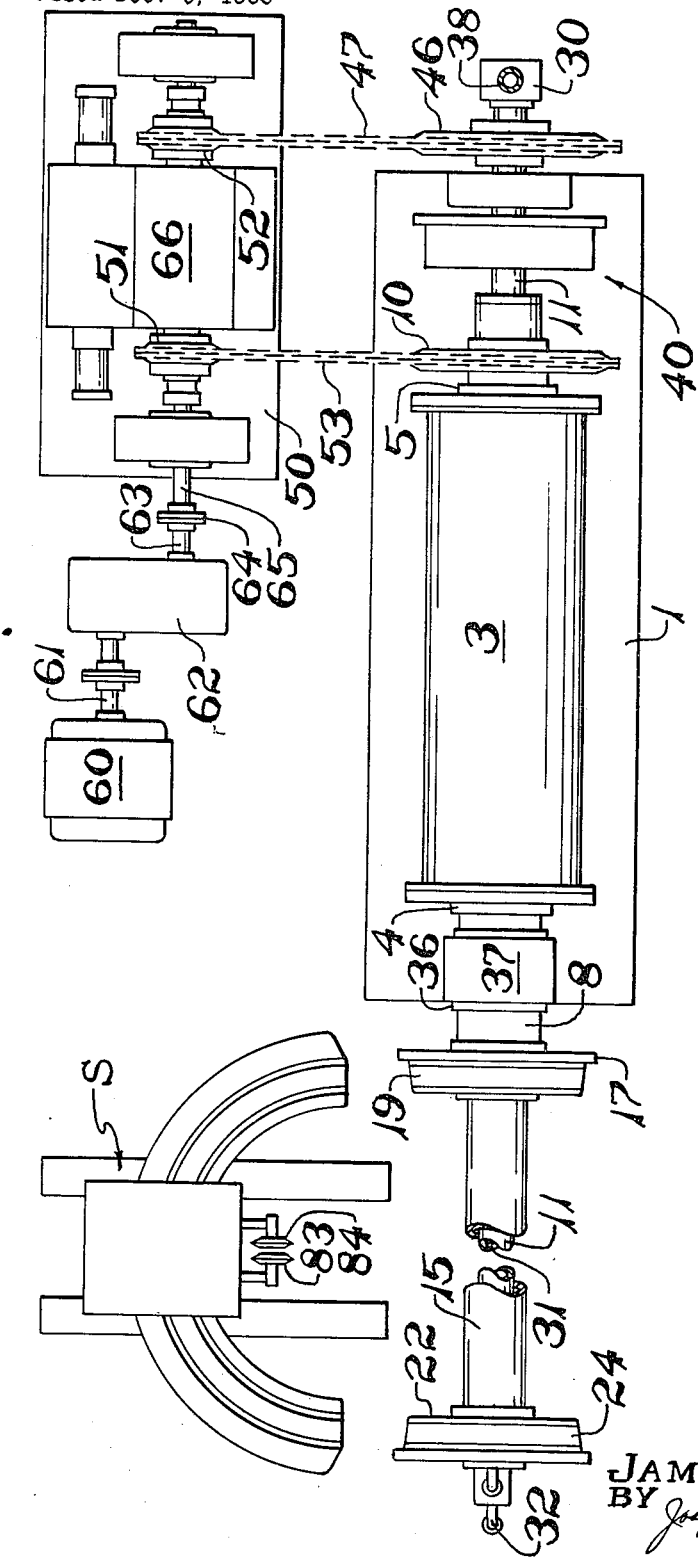

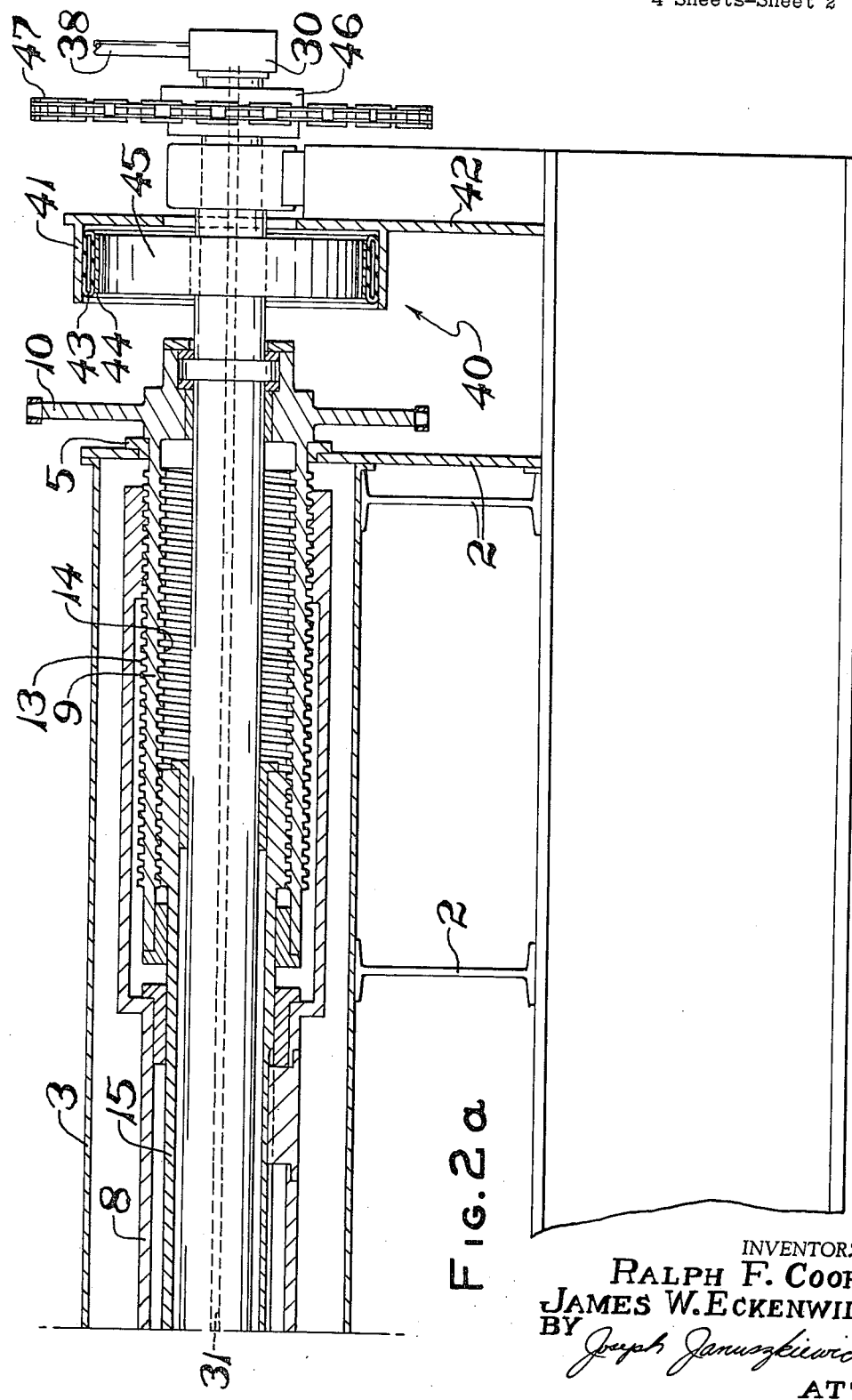

ABSTRACT OF THE DISCLOSURE

A tire shaping apparatus for shaping into a toroidal form a green tire carcass built in the form of a flat band which utilizes axially movable flanges mounted on a cantilever shaft and the application of fluid pressure directly to the internal surface of the tire carcass as such flanges are moved axially toward each other.

---

Figure 2A:
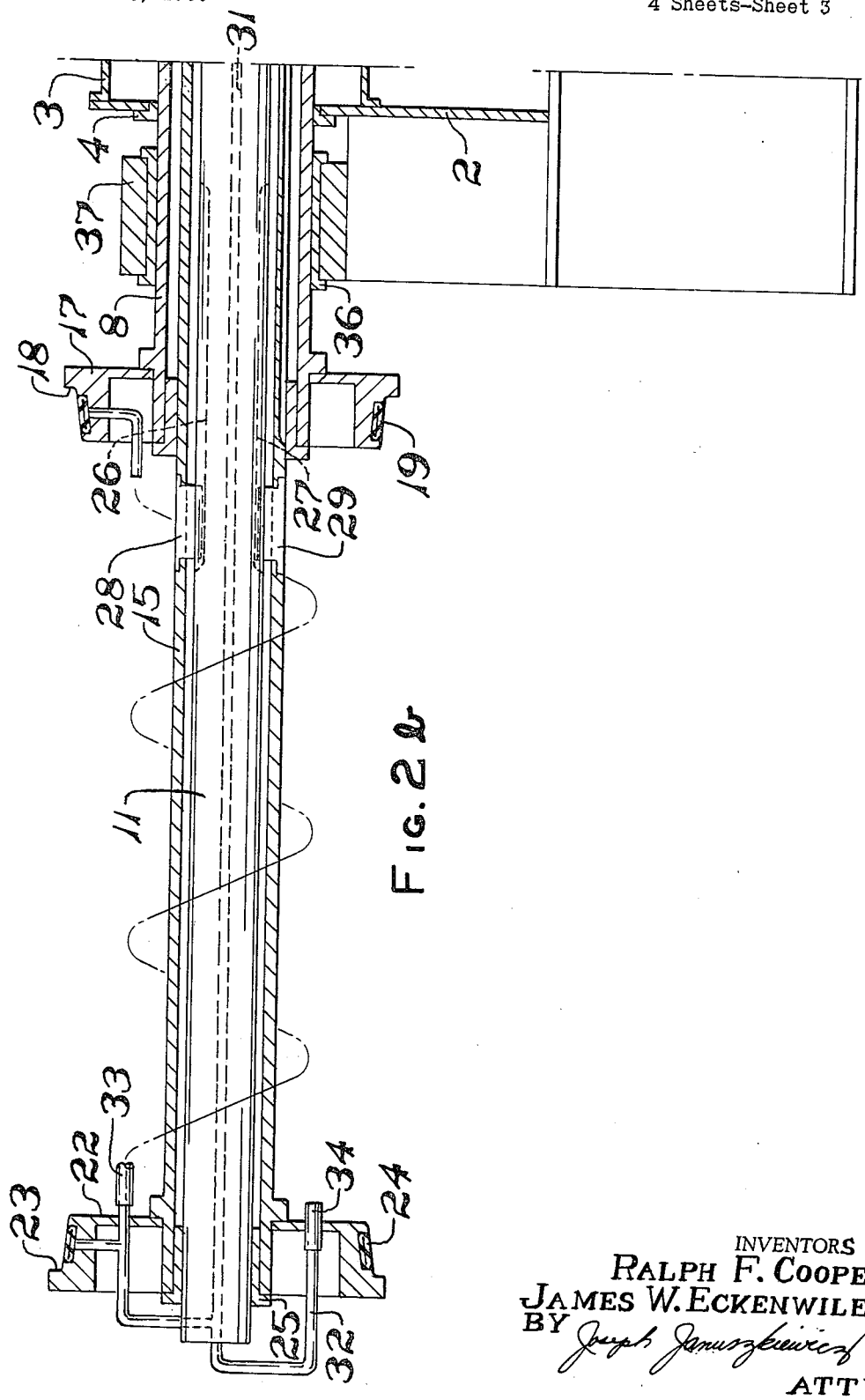

This invention relates to an apparatus for shaping tires and more particularly to an apparatus for shaping green tire carcasses built in the so called flat band method.

In the flat band method of building tires, plies of rubberized cord fabric constituting the carcasses are layed over a flat drum-like structure, with the edges of the plies wrapped in various methods about the beads. After the tread breaker and chafer strips are applied, the drum is collapsed and the tire in the flat band form is removed, shaped and vulcanized.

In many of such tire constructions the breaker structure is substantially longitudinally inextensible and therefore must be applied to the tire carcass after the carcass is shaped into a toroidal tire form. One tire shaping machine utilized a bladder to aid in the forming process; however it was difficult to remove such formed tires from the machine. Others used pneumatic cylinders to move the flanges axially, which method did not have the precision necessary to assure equal movement of the respective side edges of the tire carcass. The present invention contemplates an improvement thereon by employing a bladderless type of construction wherein a cylindrical shaped tire carcass of the flat band form is transferred to a second step machine, which machine performs the shaping operation. The flanges of the second step machine, mounted on a cantilever suspended shaft to facilitate the mounting and removal of the formed tire carcass, are axially movable simultaneously as the tire is inflated such that the respective flanges are moved positively under controlled action until the center portion of the tire is of the proper diameter for application of a circumferentially inextensible band.

In the drawings:

FIG. 1 is a diagrammatic plan view showing the various components of the tire shaping apparatus.

FIGS. 2a and 2b when axially aligned disclose a cross-sectional front elevational view of the means for axially moving respective flanges.

Figure 3:
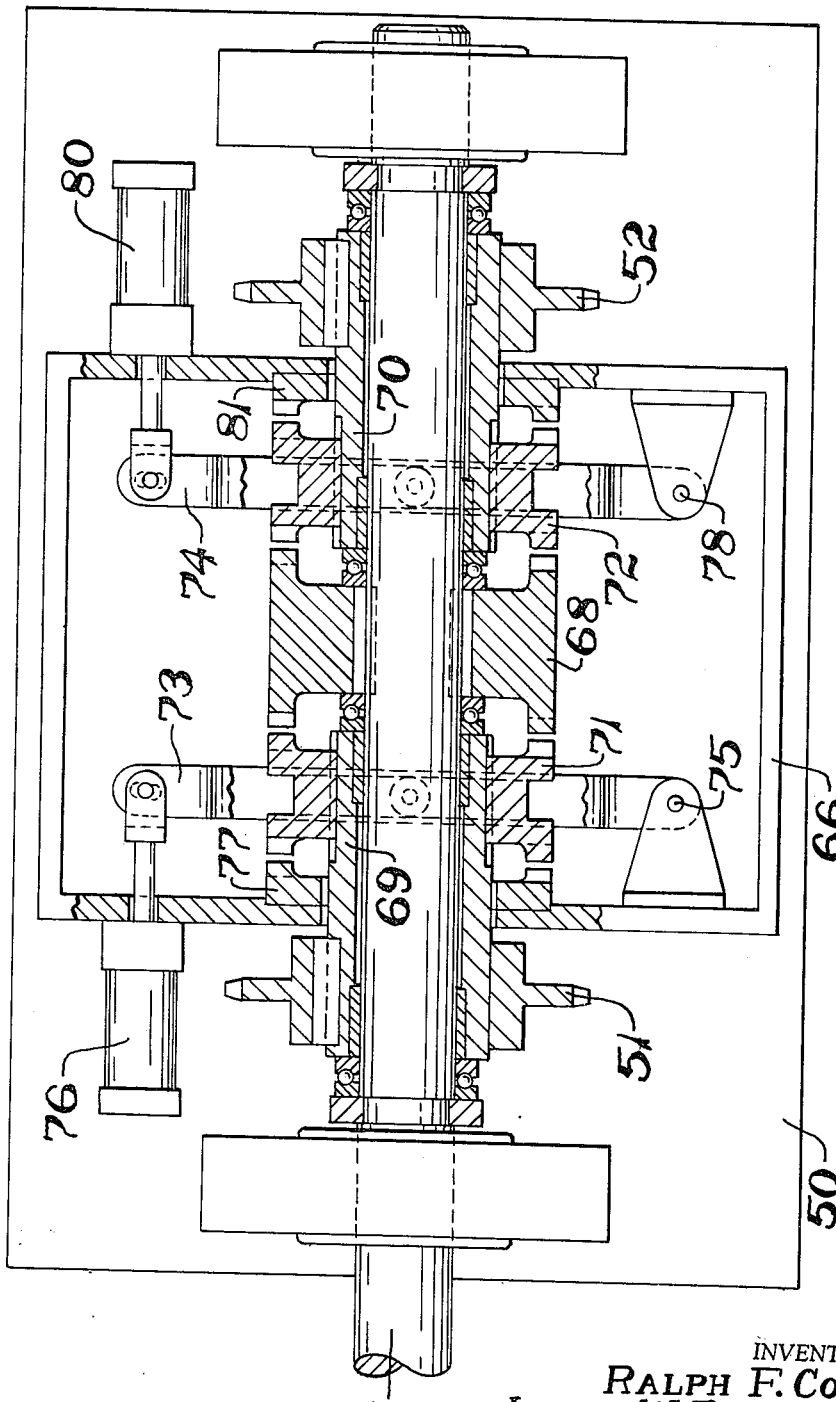

FIG. 3 is a cross-sectional plan view with portions broken away of the clutching means for the drive shown in FIGS. 2a and 2b.

Referring to the drawings wherein like reference characters designate like or corresponding parts throughout the several views there is shown in FIG. 1 a base frame 1 which supports a plurality of vertically upstanding pedestals 2 which in turn support a housing 3. Housing 3 has a pair of spaced bearing supports 4 and 5 which support for rotation and sliding movement a tubular sleeve 8 and for rotation only a hollow threaded sleeve 9 respectively. Sleeve 9, which acts as a control sleeve in a manner to be described, has one end portion suitably secured to the hub portion of a sprocket 10, which sprocket 10 is journaled for rotation on a shaft 11, which shaft 11 extends through the tubular sleeve 8 for a purpose to be described. Sleeve 9 is externally threaded as at 13 for threaded engagement with one end portion of the tubular sleeve 8 and internally threaded as at 14 for threaded engagement with the one end portion of a tubular sleeve 15, which sleeve 15 is located between shaft 11 and sleeve 8. A flange 17 is secured to the other end portion of tubular sleeve 8, which other end portion is journaled for rotation on sleeve 15. The outer circumferentially extending edge portion of flange 17 is recessed as at 18 to provide a seat for the bead of a tire carcass as well as an inflatable bladder 19 which bladder 19 upon inflation cooperates with the bead of the tire carcass to form a positive seal therebetween. A removable flange 22 is secured to the other end portion of tubular sleeve 15, which flange 22 is recessed at its outer circumferential edge as at 23 to facilitate and provide a seat for the bead of the tire carcass as well as an inflatable bladder 24. Flange 22 is removable to facilitate the loading and unloading of a tire carcass as is old and well known in the art. Bladder 24 upon inflation cooperates with the tire carcass to form an air tight chamber in cooperation with the flange 17. Flange 22 is supported by a bearing 25 on the outboard end portion of shaft 11. Shaft 11 has a pair of longitudinally extending keyway recesses 26 and 27 at the intermediate portion thereof, which recesses slidingly receive keys 28 and 29 respectively, which keys 28 and 29 are secured to the tubular sleeve 15. Such arrangement of keys and recesses permits relative sliding movement between sleeve 15 and shaft 11 but prevents relative rotation therebetween. A rotary union 30 mounted on the one end portion of shaft 11 communicates with a bore 31 which extends longitudinally through such shaft 11 and communicates with a conduit 32 on the outboard end portion of shaft 11. Conduit 32 communicates with the inflatable bladder 24 and via a hose 33, which is spirally wound about the tubular sleeve 15, with bladder 19 as well as with a valve 34 on flange 22 which valve 34 communicates with the chamber as defined by the tire carcass and the spaced flanges 17 and 22. A support bearing 36 is mounted on vertically extending support 37 on base frame 1 provides additional support for the tubular sleeve 8 as shown in FIG. 1. Rotary union 30 is connected by conduit 38 to a suitable source of pressure supply and control means which selectively controls the pressurization of the hose 33 and valve 34 which in turn controls the pressurization of the bladders 19 and 24 as well as the chamber as defined by the tire carcass and the flanges 17 and 22. A brake 40 comprising a housing 41 suitably secured to the base frame 1 as by brackets 42 has a rubber bag 43 to which air under pressure may be introduced by conventional means not shown in order to press brake shell 44 radially against a metal drum 45 which is secured to the shaft 11. Actuation of the brake 40 assures the non-rotation of shaft 11 when the sleeves 15 and 8 are rotated relative thereto. Shaft 11 has a sprocket 46 suitably keyed thereto which in turn is adapted to be engaged by a sprocket chain 47.

As viewed in FIG. 1 mounted rearwardly of base frame 1 is a support frame 50 which has mounted thereon a housing 66 shown diagrammatically as having a pair of spaced sprockets 51 and 52, which sprockets are connected by sprocket chains 53 and 47 to sprocket 10 and 46 respectively. A motor 60 is connected by an output shaft 61 to a speed reducer and transmission 62 which provides the preselected input drive means to a shaft 63 which via coupling 64 drives input shaft 65 in housing 66. Housing 66, as shown in FIG. 3, contains the clutching mechanism for the respective sprockets 51 and 52.

Suitably journaled in housing 66 is the one end portion of shaft 65 having keyed to the intermediate portion thereof for rotation therewith a driven jaw clutch 68. Journaled for rotation on shaft 65 and on opposite side portions of jaw clutch 68 and adjacent thereto are a pair of sleeves 69 and 70. Keyed to sleeves 69 and 70 for axial movement thereon are double faced jaw clutches 71 and 72 respectively, which jaw clutches are centrally circumferentially grooved to receive projections for levers 73 and 74 respectively. The sliding jaw clutch 71 is shifted laterally by means of lever 73 which has one end pivoted to the frame as at 75 and actuated by means of a fluid pressure cylinder 76 having its piston rods connected to the other end portion of such lever 73. Actuation of cylinder 76 shifts the lever 73 and jaw clutch 71 laterally to either engage the driven jaw clutch 68 or to engage a stationary clutch member 77 which is fixed to the housing 66 on frame 50. Jaw clutch 72 is shifted by means of lever 74 which is pivoted as at 78 to the frame of the housing 66 and actuated by means of fluid pressure cylinder 80. Actuation of cylinder 80 shifts lever 74 and the jaw clutch 72 either in one direction to engage the jaw clutch 68 or in the opposite direction to engage a stationary clutch member 81 which is fixed to the housing 66.

The mechanism for stitching the overhead and tread as well as the chafer strips onto the preformed green tire carcass comprises a stitching apparatus designated S (in FIG. 1) which mechanism is old and well-known in the art and it is sufficient to show that such mechanism advances toward and away from the flanges in cooperation with stitching rollers 83 and 84.

In the operation of the tire apparatus, a radial filament tire or any other conventional green tire carcass which has been partially built on a conventional profile type drum is located with its beads on the flanges 17 and 22. Such position of the flanges is shown in FIG. 2b. Initially the bladders 19 and 24 are inflated to seal the tire carcass located on such flanges 17 and 22. The cylindrical shaped tire located on such flanges is converted to an annular shape by pressurizing the chamber defined by such tire carcasses and the respective flanges 17 and 22 and the axial movement of the respective flanges 17 and 22 toward each other. Pressurized air thereto via rotary union 30 is admitted through bore 31 and valve 34 into such chamber from a suitable pressure source while inflating the bladders 19 and 24. As the chamber is pressurized, flanges 17 and 22 are moved axially towards each other by rotating tubular sleeve 9 relative to the threaded portions of sleeve 15 and 8 while holding shaft 11 stationary. Such action is effected by pressurizing the rod end of fluid pressure cylinder 80 which pivots lever member 74 in a clockwise direction as viewed in FIG. 3 to move jaw clutch 72 into clutching engagement with stationary clutch 81, which action prevents sprocket 52 from rotating, which in turn prevents the rotation of sprocket 47 and the shaft 11. With sleeve 15 keyed to the shaft 11, flanges 22 and 17 can only slide relative to the stationary shaft 11 and no rotation takes place there-between. Simultaneously with such action, the head end of fluid pressure cylinder 76 is pressurized which moves lever member 73 in a clockwise direction, as viewed in FIG. 3, which slides jaw clutch 71 into meshing engagement with a driven jaw clutch 68 such that rotation is imparted to the sprocket 51 via sleeve 69 to which sprocket 51 and jaw clutch 71 are connected. Sprocket 51 via chain 53 imparts rotation to sprocket 10 which in turn rotates threaded sleeve 9 which in turn moves the respective tubular sleeves 15 and 8 toward each other at their outboard end portions as viewed in FIG. 2b, such that the respective flanges 17 and 22 are moved axially toward each other. After the respective flanges 17 and 22 are moved axially a sufficient distance to shape the green carcass into a toroidal shape, the rod end of cylinder 80 is pressurized to pivot lever 74 in a counter-clockwise direction moving jaw clutch 72 into meshing engagement with driven jaw clutch 68 such that both jaw clutches 71 and 72 are rotated by such clutch 68, which in turn impart rotation to sleeves 69 and 70 and their respective sprockets 51 and 52. With the rotation of sprockets 46 and 10 via chains 47 and 53 from sprockets 51 and 52, shaft 11 and sleeve 9 rotates, thereby imparting rotation to the respective flanges 17 and 22 such that the tire carcass is also rotated at some slow speed for proper initial distribution of the carcass to prevent any undue strain of the cords. The sequence of moving the flanges axially and inflating the tire carcass as well as rotating the tire carcass can be effected as desired until the tire carcass is of the shape desired. Thereafter the overhead band is stitched thereto by the stitching mechanisms in a manner well known in the art, after which the stitching mechanism S is moved back from the formed tire carcass. With the green tire so shaped, flanges 17 and 22 are moved axially away from each other to release the respective bead portions of the tire carcass therefrom by reversing rotation of the input to the driven shaft 65 while maintaining jaw clutch 71 engaged with driven jaw clutch 68 and jaw clutch 72 engaged with stationary clutch 81. Sprocket 8 is rotated in a direction such that tubular threaded sleeve 9 effects movement of the respective outboard end portions of tubular sleeves 15 and 8 and their flanges 17 and 22 away from each other to the position as shown in FIG. 2b. As set forth above, in order to obtain rotation of the respective rim flanges 17 and 22 without separating them, it is necessary to move jaw clutch 72 into lateral engagement with the jaw clutch 68 which is effected by by pressurization of the head end of pneumatic cylinder 80 which in turn pivots lever member 74 in a counter-clockwise direction which moves jaw clutch 72 into engagement with jaw clutch 68. In addition the head end of pneumatic cylinder 76 is pressurized which pivots lever member 73 in a clockwise direction to move the jaw clutch 71 laterally in engagement with the jaw clutch 68 such that the respective jaw clutches 71 and 72 are in intermeshing engagement with the jaw clutch 68. With sleeves 69 and 70 respectively supporting clutches 71 and 72 and sprockets 51 and 52, jaw clutch 68 rotates through such sprockets 51 and 52 via chains 53 and 47 sprockets 10 and 47. Such action rotates threaded sleeve 9, and shaft 11 simultaneously along with tubular sleeve 8 and 15. Since there is no relative rotation betwen respective threaded portions of tubular sleeve 8 and 15 relative to sleeve 9, there is no axial movement relative to each other.

Through the cantilevered structure of the drive shaft 11 which supports the respective flanges 17 and 22 which in turn supports the tire carcass, precise linear control movements of the flanges 17 and 22 is maintained insuring precise control of the tire, with even distribution of the plies and uniform movement of the respective flanges. Such tire apparatus described utilizes a simple mechanism, which effectively controls the quality of the tire manufactured.

We claim:

1. An apparatus for building and shaping a cylindrical tire building band into a toroidal shape comprising a support frame; a longitudinally extending shaft having its one end journaled for rotation on said frame; a first tubular sleeve slidably mounted on said shaft; said first sleeve being splined to said shaft to provide simultaneous rotation and facilitate sliding movement therebetween; a second tubular sleeve slidably mounted on said first sleeve; said first and said second tubular sleeves having rim flanges connected thereto respectively to receive the respective bead portions of the tire carcass thereon; a first drive means threadedly engaging each of said sleeves; second drive means operatively connected to said shaft for rotating said shaft; said first drive means includes a sleeve member having an internally and externally threaded portion; said first sleeve having a threaded portion threadedly engaged by said internally threaded portion of said sleeve member; said second tubular sleeve having a threaded portion threadedly engaged by said externally threaded portion of said sleeve member; said internally and externally threaded portions are of opposite hand to move said tubular sleeves toward or away from each other in accordance with the direction of rotation of said first drive means; control means operatively connected to said first and said second drive means to selectively rotate said drive means simultaneously to provide rotation of said flanges with said shaft or to rotate said first drive means while braking said second drive means to move said flanges axially toward or away from each other in accordance with the direction of rotation of said first drive means; said control means includes a driven shaft operatively connected to transmission means for selective rotation thereof; a driven jaw clutch mounted on said shaft for rotation therewith; a pair of spaced collars rotatably journaled on said shaft on opposite side portions of said driven jaw clutch; each collar having a movable jaw clutch splined thereon for axial movement thereon and rotation therewith; a pair of stationary jaw clutches fixed to the frame of said transmission; actuating means operatively connected to said movable jaw clutches for selective axial movement thereof to selectively engage said adjacent stationary collar or said driven jaw clutch; each of said collars having keyed thereto a sprocket; one of said sprockets connected to said first drive means; and the other of said sprockets connected to said second drive means.

2. An apparatus for building and shaping a cylindrical tire building band into a toroidal shape comprising a support frame; longitudinally extending shaft having its one end journaled for rotation on said frame; a pair of sleeves slidably mounted on said shaft for axially telescopic movement thereon relative to said shaft and relative to each other; one end of each of said sleeves supporting a rim flange; each flange having a circumferentially extending seat for receiving an annular bead edge of the cylindrical band; the other end of each of said sleeves threadedly engaging a control sleeve; said control sleeve comprises a sleeve having an externally and internally threaded portion for threaded engagement with said other end portions of said first mentioned sleeves; and said control sleeve having a first sprocket mounted thereon; said shaft having a second sprocket mounted thereon for rotating said shaft; control means operatively connected to said control sleeve and said shaft to selectively rotate said control sleeve and said shaft to provide simultaneous rotation of said flanges with said shaft or to selectively rotate said control sleeve while braking said shaft to move said flanges axially toward or away from each other in accordance with the direction of rotation of said control means; said control means includes a driven shaft operatively connected to transmission means for selective rotation thereof; a driven jaw clutch mounted on said driven shaft for rotation therewith; a pair of spaced collars journaled on said driven shaft for rotation thereon; each of said collars supporting a stationary jaw clutch fixed to the housing of said transmission; each of said collars having a jaw clutch splined thereon for axial movement thereon and rotation therewith; actuating means operatively connected to said jaw clutches on said collars for selective axial movement thereof to selectively engage said adjacent stationary collar or said driven jaw clutch; and each of said collars having a sprocket for engagement with said first and second drive means respectively.

References Cited

UNITED STATES PATENTS

| | | | |
|---|---|---|---|
| 3,107,192 | 10/1963 | McNenney | 156—416 |
| 3,127,294 | 3/1964 | Porter | 156—416 XR |
| 3,138,510 | 6/1964 | Hindin et al. | 156—416 |
| 3,235,435 | 2/1966 | Pouilloux | 156—415 |
| 3,342,663 | 9/1967 | Pouilloux | 156—416 |
| 3,364,093 | 1/1968 | Porter | 156—415 |

BENJAMIN A. BORCHELT, Primary Examiner

S. C. BENTLEY, Assistant Examiner

U.S. Cl. X.R.

156—416